United States Patent [19]

Ozawa et al.

[11] Patent Number: 4,826,925

[45] Date of Patent: May 2, 1989

[54] RUBBER COMPOSITIONS

[75] Inventors: Osamu Ozawa, Hiratsuka; Tetsu Kitami, Hadano, both of Japan

[73] Assignee: The Yokohama Rubber Co., Ltd., Tokyo, Japan

[21] Appl. No.: 72,567

[22] Filed: Jul. 13, 1987

[30] Foreign Application Priority Data

Jul. 15, 1986 [JP] Japan .................................. 61-166436
May 18, 1987 [JP] Japan .................................. 62-120858

[51] Int. Cl.$^4$ ........................ C08C 19/22; C08C 19/20
[52] U.S. Cl. .............................. 525/331.8; 525/332.7; 525/348
[58] Field of Search .................. 525/348, 381.1, 381.8, 525/331.8, 332.7

[56] References Cited

U.S. PATENT DOCUMENTS

| | | | |
|---|---|---|---|
| 3,366,598 | 1/1968 | Westlinning | 525/348 |
| 3,801,537 | 4/1974 | Westlinning | 525/348 |
| 3,980,629 | 9/1975 | Sacrini | 525/149 |

Primary Examiner—Christopher Henderson
Attorney, Agent, or Firm—Finnegan, Henderson, Farabow, Garrett & Dunner

[57] ABSTRACT

Rubber compositions are disclosed which are characterized by enhanced adhesion to hydrogenated acrylonitrile-butadiene rubbers and to metallic and fibrous materials, and also be improved modulus at 100% elongation, and hence are suitable particularly for use in tires, belts, molded articles, rubber rolls and hoses. Such physical characteristics are obtained by the use of specified amounts of a selected class of sulfurs, organic peroxides and triazine compounds combined with selected sulfur-curable base rubbers.

5 Claims, 1 Drawing Sheet

RUBBER COMPOSITIONS

BACKGROUND OF THE INVENTION

1. Field of the Invention

This invention relates to rubber compositions suitable particularly for adhesion to hydrogenated rubbers and also to metallic and fibrous materials.

2. Prior Art

Generally, rubber products including tires, belts, molded articles, rubber rolls, hoses and the like are exposed to elevated temperature and heavy load when applied to automotive vehicles, construction machinery or hydraulic devices. Such rubber products therefore should be highly resistant to heat and oil over prolonged periods of time.

Various rubbers have been proposed which are resistant to oils and high temperatures of 120°–150° C., and they include acrylonitrile-butadiene copolymer rubber (NBR), acrylic rubber (ACM), ethylene-acrylic copolymer rubber (AEM), ethylene-acrylic-vinyl acetate terpolymer rubber (ER), chlorosulfonated polyethylene rubber (CSM), chlorinated polyethylene rubber (CM) and acrylonitrile-butadiene copolymer rubber having its conjugated dienes rearranged by hydrogenation (hydrogenated NBR). These known high-performance rubbers are in many instances used as composite structures made up of reinforcing metals such particularly as brass and fibers.

Sulfur is known to facilitate the adhesion of rubbers to brass and fiber. The high-performance rubber however when sulfur-vulcanized fails to fully exhibit its heat resistance, leading to quality deterioration. Non-sulfur vulcanization, gives adequate heat resistance, but is literally unsatisfactory in respect of adhesion to brass and fiber.

To improve both heat resistance and adhesion to metal and to fiber, a certain metal- or fiber-adhesive intermediate rubber is usually interposed between the high-performance rubber and the reinforcing material. Most thermally resistant among the aforementioned high-performance rubbers is hydrogenated NBR rubber which however calls for vulcanization with an organic peroxide. This rubber so vulcanized is effective for adhesion to peroxide-vulcanized rubbers but not to brass or to fiber. Sulfur-vulcanized rubbers are good for brass and fiber, but often induce interfered vulcanization reaction when contacted with peroxide-vulcanized hydrogenated NBR rubber.

Hydrogenated NBR rubber may be composed of peroxide and sulfur so as to provide balanced heat resistance and adhesion qualities. This type of composition is adhesive only to a limited extent, involving interfered reaction between the two systems of vulcanization, hence deteriorated resistance of the vulcanizate to brittle fracture under external forces applied as by dynamic vibration. Thus, there has arose an urgent need for an improved rubber composition which is capable of rendering hydrogenated NBR rubber feasible where they must be used in combination with brass and fiber.

SUMMARY OF THE INVENTION

It has now been found that rubber compositions of superior adhesion and modulus characteristics can be obtained by the use of sulfur, organic peroxides and triazine compounds combined with sulfur-vulcanizable base rubbers.

The rubber compositions contemplated by the invention essentially comprise an organic peroxide which is conductive to strong adhesion to hydrogenated NBR rubber, a triazine compound which gives great adhesion to metal and fiber, and sulfur which affords improves modulus. The compositions are suitable particularly for use in the production of tires, belts, molded articles, rubber rolls and hoses.

It is therefore the primary object of the invention to provide new and improved rubber compositions which excel in adhesion to peroxide-vulcanized hydrogenated NBR rubber and also to brass and fiber without involving interfered vulcanization reaction.

This and other objects and features of the invention will be better understood from the following detailed description taken in connection with the accompanying drawings.

According to the invention, there is provided a rubber composition comprising: (a) a sulfur-vulcanizable starting rubber; (b) a sulfur in an amount of 0.1–10 parts by weight based on 100 parts by weight of the starting rubber; (c) an organic peroxide in an amount of 0.2–15 parts by weight based on 100 parts by weight of the starting rubber; and (d) a 6-R-2,4-dimercapto-1,3,5-triazine compound in an amount of 0.2–15 parts by weight based on 100 parts by weight of the starting rubber, the triazine compound being represented by the formula

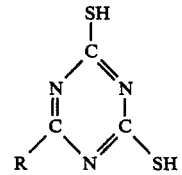

where R is a mercapto, alkoxy, mono- or di-alkylamino, mono- or di-cycloalkylamino, mono- or di-arylamino, or N-alkyl-N'-arylamino group.

DETAILED DESCRIPTION OF THE INVENTION

Figure 1:
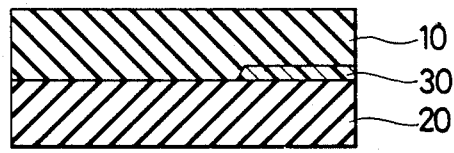
FIG. 1 is a cross-sectional view of a test composite sheet structure having a certain rubber composition laminated with peroxide-vulcanized hydrogenated NBR rubber.

Starting rubbers eligible for the purpose of the invention are natural and synthetic rubbers capable of sulfur vulcanization. Typical examples include natural rubber (NR), polyisoprene rubber (IR), styrene-butadiene copolymer rubber (SBR), polybutadiene rubber (BR), acrylonitrile-butadiene copolymer rubber (NBR), ethylene-propylene-diene terpolymer rubber (EPDM) and the like.

Sulfurs to be used herein include for example particulate sulfur, precipitated sulfur, colloidal sulfur, insoluble sulfur, highly dispersible sulfur, sulfur chloride and the like.

The amount of the sulfur to be added should be in the range of 0.1–10 weight parts, preferably 0.2–5 weight parts, based on 100 parts by weight of the starting rubber. Smaller amounts than 0.1 part would result in reduced modulus, and larger amounts than 10 parts would lead to interfered reaction with peroxide-vulcanized hydrogenated NBR rubber.

Eligible organic peroxides are such which allow crosslinking to occur to a moderate extent at curing temperature. To this end, dialkyl peroxides are preferred which have a half-life period of 10 hours and a decomposition temperature of higher than 80° C. Specific examples include dicumyl peroxide, 1,3-bis-(t-butylperoxyisopropyl)-benzene, 4,4'-di-tert-butyl-peroxy valeric acid n-butyl and the like.

The amount of the organic peroxide to be added should be in the range of 0.2-15 weight parts as calculated in terms of the net content, preferably 0.5-5 weight parts, based on 100 parts by weight of the starting rubber. Smaller amounts than 0.2 part would fail to give sufficient adhesion to peroxide-vulcanized hydrogenated NBR rubber. Larger amounts than 15 parts would leave the peroxide unconsumed, making the vulcanizate less heat-resistant.

Triazine compounds useful in the invention are 6-R-2,4-dimercapto-1,3,5-trazines represented by the formula

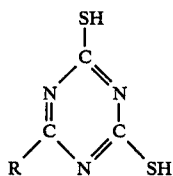

where R is a mercapto, alkoxy, mono- or di-alkylamino, mono- or di-cycloalkylamino, mono- or di-diarylamino, or N-alkyl-N'-arylamino group. 2,4,6-Trimercapto-1,3,5-triazine is particularly preferred.

The amount of the triazine compound to be added should be in the range of 0.2-15 weight parts, preferably 0.5-10 weight parts, based on 100 parts by weight of the starting rubber. Smaller amounts than 0.2 part would cause reduced modulus, hence deteriorated adhesion to brass and fiber. Larger amounts than 15 parts would produce no better results.

There may also be used various additives such as vulcanization accelerators, antioxidants, fillers, softeners, plasticizers, tackifiers, lubricants, peptizers, colorants, foaming agents, vulcanizing activators, dispersants, processing aids and the like.

The triazine compound according to the invention serves to act as an accelerator in sulfur vulcanization. To attain improved modulus of the vulcanizate, separate accelerators may suitably be added which include for example aldehyde-ammonias, aldehyde-amines, guanidines, thioureas, thiazoles, sulfenamides, thiurams, dithiocarbamates, xthantogenates and the like.

The rubber composition of the invention permits strong adhesion to peroxide-vulcanized hydrogenated NBR rubber and also to brass and to fiber. There is no particular restriction imposed on the kind of fibers which however may be selected from organic fibers such for example as polyhexamethylene adipamide (nylon-66), polycaprolactum (nylon-6), polyvinyl alcohol, polyethylene terephthalate (polyester), rayon, aromatic polyamide, aromatic polyester and the like. Particularly preferred is such a fiber treated with a mixture of resorcin-formalin condensate and a latex.

The following examples are given to further illustrate the invention. All formulation units are parts by weight unless otherwise noted.

EXAMPLES 1-17 AND COMPARATIVE EXAMPLES 1-7

Hydrogenated NBR composition A was formulated as per Table 1 and prepared by rolling on a mixing roll at 60° C. for 15 minutes. Different rubber compositions B were likewise prepared, the details as regards the formulations being shown in Tables 2-7.

All rubber compositions B were tested for modulus at 100% elongation and adhesion to composition A, to brass and to nylon under the conditions given below and with the results tabulated.

(1) Modulus

Each composition B was rolled on a laboratory roll to a thickness of 2.2-2.3 mm, followed by vulcanization on a laboratory press at 153° C. and at 30 kgf/cm$^2$ for 90 minutes. After disposition of the vulcanized sheet at room temperature for 24 hours, the modulus was measured in accordance with JIS K6301.

(2) Rubber-to-Rubber Adhesion

Composition A and composition B, respectively, were sheeted on laboratory roll to a thickness of 2.0 mm. As shown in FIG. 1, a test sample was formed by laminating sheet 10 of composition A with sheet 20 of composition B, both dimensioned to be 15 cm×10 cm×2.0 mm. Disposed at one end of and in the seam of the laminate was cellophane 30 as a flap for connection with a tensile tester. The laminate was press-cured on a laboratory press at 153° C. and at 30 kgf/cm$^2$ for 90 minutes. After being disposed at room temperature for 24 hours, the resulting vulcanizate was cut to a width of 2.54 cm.

Peel strength was measured on the tensile tester at a pull speed of 50 mm/minutes as stipulated in JIS K6301.

(3) Rubber-to-Brass Adhesion

Figure 2:
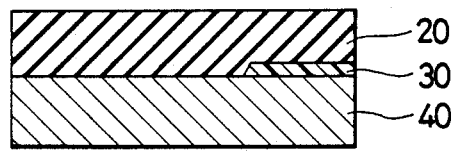
FIGS. 2 and 3 are similar to FIG. 1, but showing other test structures having the rubber composition laminated respectively with brass and with nylon.

Each composition B was sheeted on a laboratory roll to a thickness of 2.5 mm. A test sample shown in FIG. 2 was made up of sheet 20 of composition B laminated with brass plate 40, both dimensioned to be 15 cm×10 cm×2.5 mm, and cellophane flap 30 inserted therebetween. The laminate was press-cured on a laboratory press at 153° C. and at 30 kgf/cm$^2$ for 90 minutes to give a vulcanizate which was then disposed at room temperature for 24 hours.

Peel strength was determined by the procedure of item (2) above.

(4) Rubber-to-Fiber Adhesion

Figure 3:
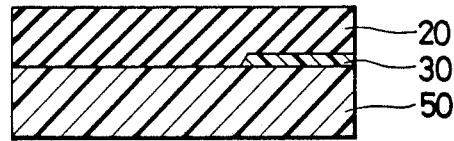

Each composition B was sheeted on a laboratory roll to a thickness of 2.5 mm. As shown in FIG. 3, a test sample consisted of sheet 20 of composition B laminated with nylon fabric 50, both dimensioned to be 15 cm×10 cm×2.5 mm, and cellophane flap 30 inserted in the seam of the laminate. Nylon fabric 50 was derived by dipping square woven nylon-66 fabric at 20° C. for 5 minutes in a mixture of a resorcin-formalin condensate and a latex, followed by driving at 140° C. for 5 minutes and subsequent heat setting at 200° C. for 3 minutes. The laminate was press-cured at 153° C. and at 30 kgf/cm$^2$ for 90 minutes. The vulcanizate after being disposed at room temperature for 24 hours was cut to a width of 2.54 cm.

Peel strength was determined by the procedure of item (2) above.

In Tables 2-7, the adhesion qualities were assessed as follows:
(1) Rubber-to-Rubber Adhesion
adhesion strength: kgf/2.5$^4$ cm
adhesion appearance ⊙ high peel strength at fracture
○ low peel strength at fracture
△ high peel strength at interfacial release
× low peel strength at interfacial release (2) Rubber-to-Brass Adhesion
○ good rubber coverage
× poor rubber coverage (3) Rubber-to-Fiber Adhesion
○ good rubber coverage
× poor rubber coverage The control vulcanized with sulfur alone, Comparative Example 1, was unacceptable in rubber-to-rubber adhesion as is apparent from Table 2. The peroxide-vulcanized control of Comparative Example 2 showed inadequate adhesion to brass and nylon.

As appears clear from Table 3, Examples 1 and 2 representing the invention are highly satisfactory in respect of adhesion to all the materials tested. Comparative Example 3 devoid of triazine revealed reduced modulus, resulting in poor adhesion to brass and to nylon.

Table 4 demonstrates that Examples 4–6 using different accelerators give improved adhesion to rubber, to brass and to nylon, meaning that the compositions of the invention are capable of a wide choice of accelerators.

The use of triazine beyond the above specified range failed to give acceptable adhesion to brass and nylon as evidenced by Comparative Example 4.

The greater adhesion to rubber, the larger is the amount of peroxide to be added as is clear from Tables 6 and 7. Sulfur added in larger amounts is effective for attaining higher modulus. Comparative Example 5 in which were used small amounts of sulfur and peroxide invited insufficient modulus, leading to unacceptable adhesion to rubber, to brass and to nylon.

Having thus described the invention, it will be apparent to those skilled in the art that various changes and modifications may be made to the invention without departing from the scope of the appended claims.

TABLE 1

Rubber Composition A Formulation

| | |
|---|---|
| hydrogenated NBR | |
| (VCN: 33) | 100 |
| (C=C: 1.3) | |
| (C-C: 65.7) | |
| SRF (1) | 95 |
| MgO | 10 |
| ZnO | 2 |
| stearic acid | 1 |
| Vulkanox DDA (2) | 1.5 |
| Vulkanox ZMB-2 (3) | 1.5 |
| Wax (4) | 1 |
| TAIC (5) | 2 |
| Witamol 218 (6) | 7 |
| Perkadox 14/40 (7) | 7.5 |

(1) SRF, Asahi No. 50, Asahi Carbon Co.
(2) Vulkanox DDA, diphenylamine derivative, Bayer AG
(3) Vulkanox ZMB-2, 4,5-methylmercapto-benzimidazole zinc salt, Bayer AG
(4) Wax, RE 520, Hoechst AG
(5) TAIC, triallylisocyanate, Nippon Chemical Co.
(6) Witamol 218, trimellitic acid ester, Dynamit Nobel AG
(7) Perkadox 14/40, 1,3-bis-(t-butylperoxy-isopropyl)-benzene, peroxide content 40 wt. %, Kakayu Noury Corp.

TABLE 2

Rubber Composition B: Vulcanization with Sulfur or Organic Peroxide Alone

| | Comparative Examples | |
|---|---|---|
| Formulations/Properties | 1 | 2 |
| Nipol 1042 (8) | 100 | 100 |
| SRF (1) | 80 | 80 |
| ZnO | 5 | 5 |
| OD-3 (9) | 2 | 2 |
| sulfur | 2 | |
| Accelerator TS (10) | 1 | |
| Perkadox 14/40 (7) | | 7.5 |
| 100% modulus (kgf/cm²) | 95 | 97 |
| adhesion to rubber composition A | | |
| strength | 0.5 | 14.8 |
| appearance | x | ○ |
| adhesion to brass plate | ○ | x |
| adhesion to nylon fabric | ○ | x |

(8) Nipol 1042, NBR, Nippon Zeon Co.
(9) OD-3, Nonflex OD-3, Seiko Chemical Co.
(10) Accelerator TS, Sunceller TS-G, Sanshin Chemical Co.
(1) and (7): same as in Table 1

TABLE 3

Rubber Composition B: Addition of Triazine Compound

| | Comparative | Examples | |
|---|---|---|---|
| Formulations/Properties | Example 3 | 1 | 2 |
| Nipol 1042 (8) | 100 | 100 | 50 |
| Nipol 1502 (11) | | | 50 |
| SRF (1) | 80 | 80 | 80 |
| ZnO | 5 | 5 | 5 |
| OD-3 (9) | 2 | 2 | 2 |
| sulfur | 1 | 1 | 1 |
| Perkadox 14/40 (7) | 5 | 5 | 5 |
| ZISNET F (12) | | 1 | 1 |
| 100% modulus (kgf/cm²) | 46 | 96 | 93 |
| adhesion to rubber composition A | | | |
| strength | 10.5 | 15.2 | 14.6 |
| appearance | ○ | ⊙ | ⊙ |
| adhesion to brass plate | x | ○ | ○ |
| adhesion to nylon fabric | x | ○ | ○ |

(11) Nipol 1502, SBR, Nippon Zeon Co.
(12) ZISNET F, 2,4,6-trimercapto-1,3,5-triazine, Sankyo Chemical Co.
(1), (7), (8) and (9): same as in Tables 1 and 2

TABLE 4

Rubber Composition B: Addition of Various Accelerators

| | Examples | | | |
|---|---|---|---|---|
| Formulations/Properties | 3 | 4 | 5 | 6 |
| Nipol 1042 (8) | 100 | 100 | 100 | 100 |
| SRF (1) | 80 | 80 | 80 | 80 |
| ZnO | 5 | 5 | 5 | 5 |
| OD-3 (9) | 2 | 2 | 2 | 2 |
| sulfur | 1 | 1 | 1 | 1 |
| Perkadox 14/40 (7) | 5 | 5 | 5 | 5 |
| ZISNET F (12) | 1 | 1 | 1 | 1 |
| Accelerator TS (10) | 1 | | | |
| Accelerator NOBS (13) | | 1 | | |
| Accelerator CZ (14) | | | 1 | |
| Accelerator DM (15) | | | | 1 |
| 100% modulus (kgf/cm²) | 124 | 118 | 131 | 114 |
| Adhesion to rubber composition A | | | | |
| strength | 15.3 | 14.8 | 12.6 | 14.5 |
| appearance | ⊙ | ⊙ | ○ | ⊙ |
| adhesion to brass plate | ○ | ○ | ○ | ○ |
| adhesion to nylon fabric | ○ | ○ | ○ | ○ |

(13) Accelerator NOBS, Sunceller 232-MG, Sanshin Chemical Co.
(14) Accelerator CZ, Sunceller CM-PO, Sanshin Chemical Co.
(15) Accelerator DM, Sunceller DM-PO, Sanshin Chemical Co.
(1), (7), (8), (9), (10) and (12): same as in Tables 1–3

TABLE 5
Rubber Composition B: Varied Amounts of Triazine Compound

| Formulations/Properties | Comparative Example 4 | Examples 7 | 8 |
|---|---|---|---|
| Nipol 1042 (8) | 100 | 100 | 100 |
| SRF (1) | 80 | 80 | 80 |
| ZnO | 5 | 5 | 5 |
| OD-3 (9) | 2 | 2 | 2 |
| sulfur | 1 | 1 | 1 |
| Perkadox 14/40 (7) | 5 | 5 | 5 |
| ZISNET F (12) | 0.1 | 1 | 2 |
| 100% modulus (kgf/cm²) | 89 | 96 | 97 |
| adhesion to rubber composition A | | | |
| strength | 14.6 | 14.8 | 15.2 |
| appearance | ⊚ | ⊚ | ⊚ |
| adhesion to brass plate | x | ○ | ○ |
| adhesion to nylon fabric | x | ○ | ○ |

(1), (7), (8), (9) and (12): same as in Tables 1–3

TABLE 6
Rubber Composition B: Varied Amounts of Organic Peroxide and Sulfur

| | Peroxide 0.25 phr Comparative Examples | | | Peroxide 2.5 phr Examples | | |
|---|---|---|---|---|---|---|
| Formulations/Properties | 5 | 6 | 7 | 9 | 10 | 11 |
| Nipol 1042 (8) | 100 | 100 | 100 | 100 | 100 | 100 |
| SRF (1) | 80 | 80 | 80 | 80 | 80 | 80 |
| ZnO | 5 | 5 | 5 | 5 | 5 | 5 |
| OD-3 (9) | 2 | 2 | 2 | 2 | 2 | 2 |
| sulfur | 0.5 | 1 | 1.5 | 0.5 | 1 | 1.5 |
| Perkadox 14/40 (7) | 0.25 | 0.25 | 0.25 | 2.5 | 2.5 | 2.5 |
| ZISNET F (12) | 1 | 1 | 1 | 1 | 1 | 1 |
| Accelerator TS (10) | 1 | 1 | 1 | 1 | 1 | 1 |
| 100% modulus (kgf/cm²) | 50 | 68 | 76 | 75 | 95 | 96 |
| adhesion to rubber composition A | | | | | | |
| strength | 1.5 | 1.2 | 0.7 | 11.8 | 11.0 | 10.5 |
| appearance | x | x | x | △ | △ | △ |
| adhesion to brass plate | x | ○ | ○ | ○ | ○ | ○ |
| adhesion to nylon fabric | x | ○ | ○ | ○ | ○ | ○ |

(1), (7), (8), (9), (10) and (12): same as in Tables 1–3

TABLE 7
Rubber Composition B: Varied Amounts of Organic Peroxide and Sulfur

| | Peroxide 5 phr | | | Peroxide 7.5 phr | | |
|---|---|---|---|---|---|---|
| | Examples | | | | | |
| Formulations/Properties | 12 | 13 | 14 | 15 | 16 | 17 |
| Nipol 1042 (8) | 100 | 100 | 100 | 100 | 100 | 100 |
| SRF (1) | 80 | 80 | 80 | 80 | 80 | 80 |
| ZnO | 5 | 5 | 5 | 5 | 5 | 5 |
| OD-3 (9) | 2 | 2 | 2 | 2 | 2 | 2 |
| sulfur | 0.5 | 1 | 1.5 | 0.5 | 1 | 1.5 |
| Perkadox 14/40 (7) | 5 | 5 | 5 | 7.5 | 7.5 | 7.5 |
| ZISNET F (12) | 1 | 1 | 1 | 1 | 1 | 1 |
| Accelerator TS (10) | 1 | 1 | 1 | 1 | 1 | 1 |
| 100% modulus (kgf/cm²) | 100 | 124 | 145 | 131 | 149 | 162 |
| adhesion to rubber composition A | | | | | | |
| strength | 15.2 | 14.8 | 14.5 | 15.3 | 15.0 | 14.9 |
| appearance | ○ | ○ | ○ | ○ | ○ | ○ |
| adhesion to brass plate | ○ | ○ | ○ | ○ | ○ | ○ |
| adhesion to nylon fabric | ○ | ○ | ○ | ○ | ○ | ○ |

(1), (7), (8), (9), (10) and (12): same as in Tables 1–3

What is claimed is:

1. A rubber composition comprising:
   (a) a sulfur-vulanizable starting rubber;
   (b) sulfur in an amount of from 0.1–10 parts by weight based on 100 parts by weight of said starting rubber;
   (c) an organic peroxide in an amount of from 0.2–15 parts by weight based on 100 parts by weight of said starting rubber; and
   (d) a 1,3,5-triazine compound in an amount of from 0.2–15 parts by weight based on 100 parts by weight of said starting rubber, said triazine compound having the formula

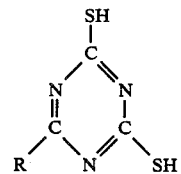

wherein R is selected from the group consisting of a mercapto, alkoxy, mono- or di-alkylamino, mono- or di-cycloalkylamino, mono- or di-arylamino, and N-alkyl-N′-arylamino group.

2. The rubber composition of claim 1 wherein said starting rubber is selected from the group consisting of natural rubber, polyisoprene rubber, styrene-butadiene copolymer rubber, acrylonitrile-butadiene copolymer rubber and ethylene-propylene-diene terpolymer rubber.

3. The rubber composition of claim 1 wherein said sulfur is selected from the group consisting of particulate sulfur, precipitated sulfur, colloidal sulfur, insoluble sulfur, dispersible sulfur and sulfur chloride.

4. The rubber composition of claim 1 wherein said organic peroxide is selected from the group consisting of dicumyl peroxide, 1,3-bis-(t-butylperoxy-isopropyl)-benzene and 4,4′-tert-butylperoxy valeric acide n-butyl.

5. The rubber composition of claim 1 wherein triazine compound is 2,4,6-trimercapto-1,3,5-triazine.

* * * * *